July 22, 1969  W. R. EPPLY  3,456,945
FOLDING SPORTS SCREEN
Filed Sept. 2, 1966  7 Sheets-Sheet 1

INVENTOR.
William R. Epply
BY
Roberts, Cushman & Grover
ATT'YS

July 22, 1969    W. R. EPPLY    3,456,945
FOLDING SPORTS SCREEN

Filed Sept. 2, 1966    7 Sheets-Sheet 2

July 22, 1969 W. R. EPPLY 3,456,945
FOLDING SPORTS SCREEN
Filed Sept. 2, 1966 7 Sheets-Sheet 3
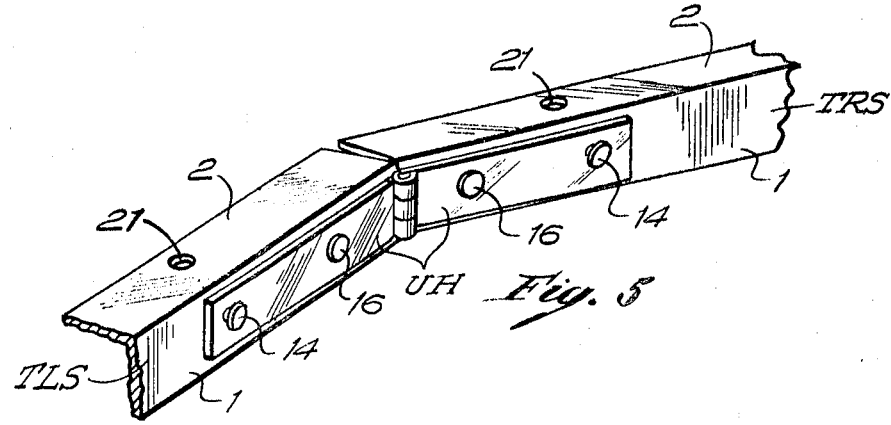
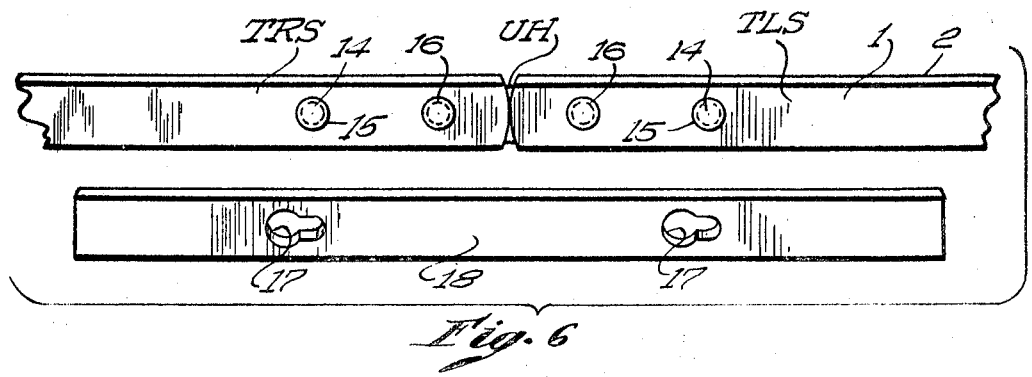
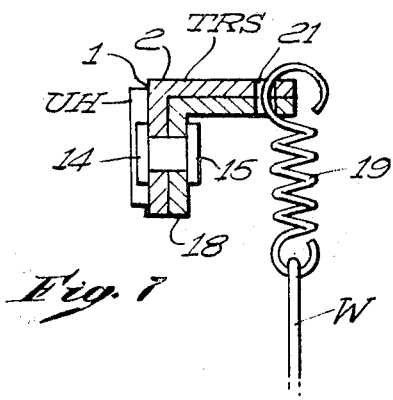

July 22, 1969 W. R. EPPLY 3,456,945
FOLDING SPORTS SCREEN
Filed Sept. 2, 1966 7 Sheets-Sheet 4

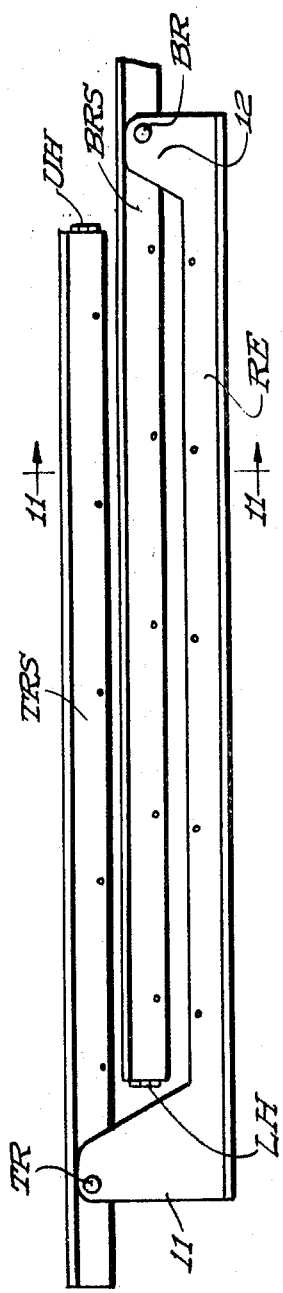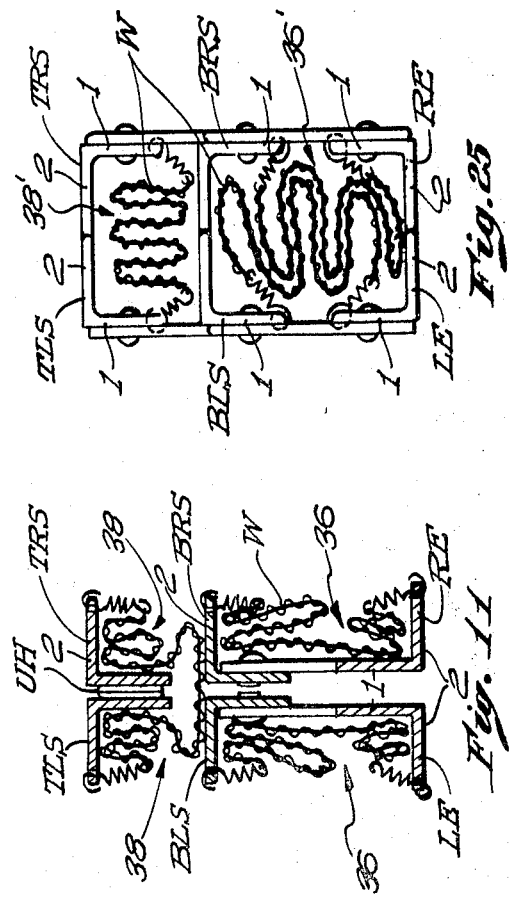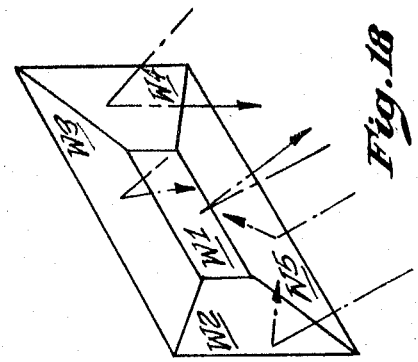

July 22, 1969  W. R. EPPLY  3,456,945
FOLDING SPORTS SCREEN
Filed Sept. 2, 1966  7 Sheets-Sheet 7

United States Patent Office 3,456,945
Patented July 22, 1969

3,456,945
FOLDING SPORTS SCREEN
William R. Epply, Hanover, N.H. 03755
Filed Sept. 2, 1966, Ser. No. 576,909
Int. Cl. A63b 63/38
U.S. Cl. 273—29             6 Claims

ABSTRACT OF THE DISCLOSURE

A portable screen comprising a rectangular frame formed, for example, of six metal L-beam members joined for supporting a web such as a rebound net against which tennis balls and the like may be bounced. When the screen is folded for storage or transporting, the net will be housed in a rectangular channel formed by the six L-beam members.

---

This invention relates to portable screens comprising a folding frame with jointed members for supporting a web such as a rebound net against which tennis balls and the like may be bounced.

A tennis rebound net, for example, should be of considerable size, approximating a good portion of a standard tennis net and the area through which balls pass over the net. It should have a rigid frame to hold the net taut, and yet because of its extended size should be easily folded to compact form when not in use. Further it should be capable of storage such as to protect the net from wear when carried after folding.

It is the object of the present invention to provide a sports screen with the above described and other desired characteristics.

According to the invention a folding screen comprises two rigid end members, two pairs of rigid side members, a rectangular web connected at its periphery along said members, coupling means connecting one end of each pair of side members to each other, and pivot means connecting the other end of each side member to one end of an end member so that the members may be arranged in rectangular form holding the web in a rectangle, each said member comprising a face strip parallel to the plane of the rectangle and a flange strip normal thereto, and said coupling and pivot means allowing said members to be folded into parallelism with each other with the face and flange strips of the members forming lengthwise channels between the members for protective storage of the web.

Figure 1:
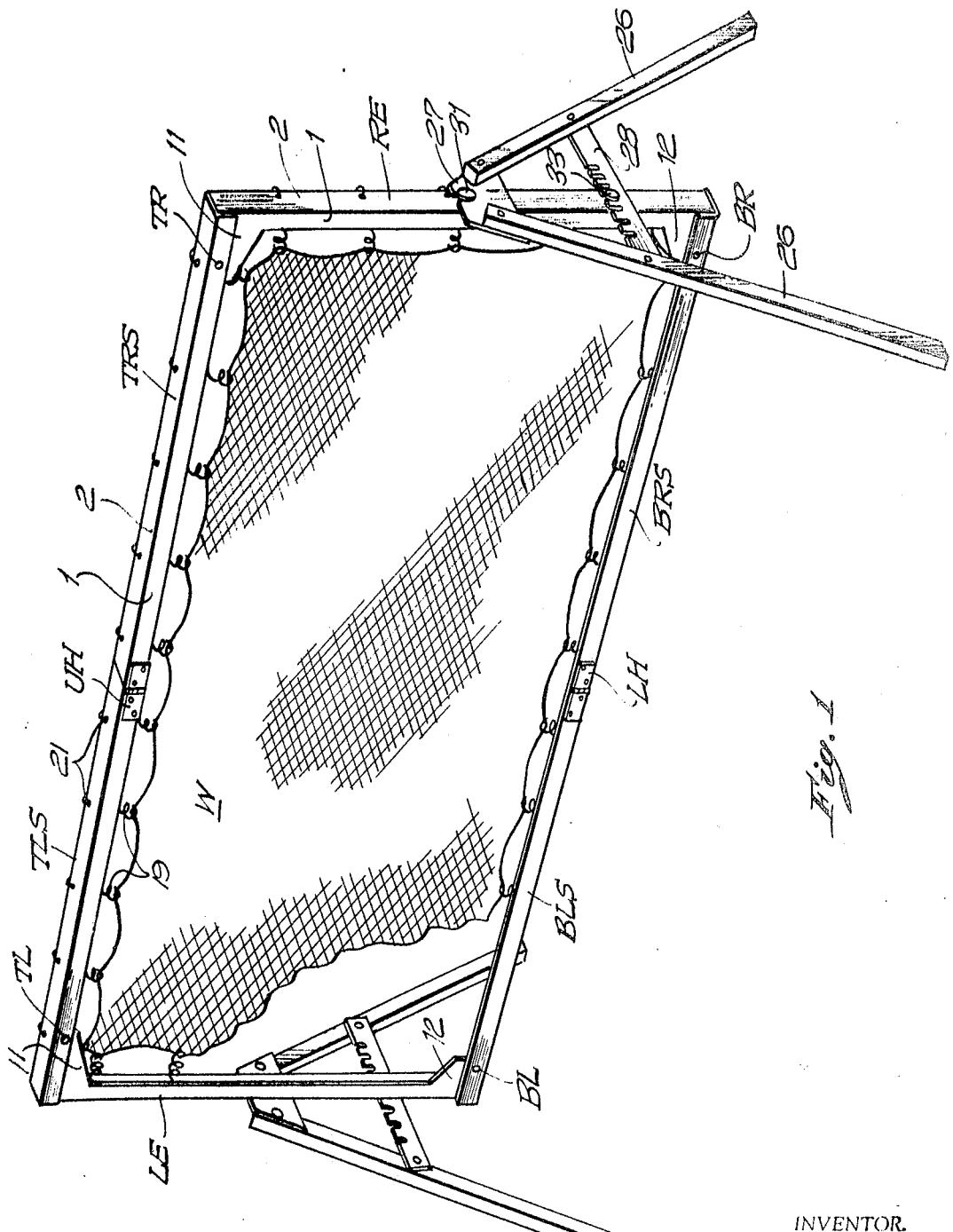
Figure 2:
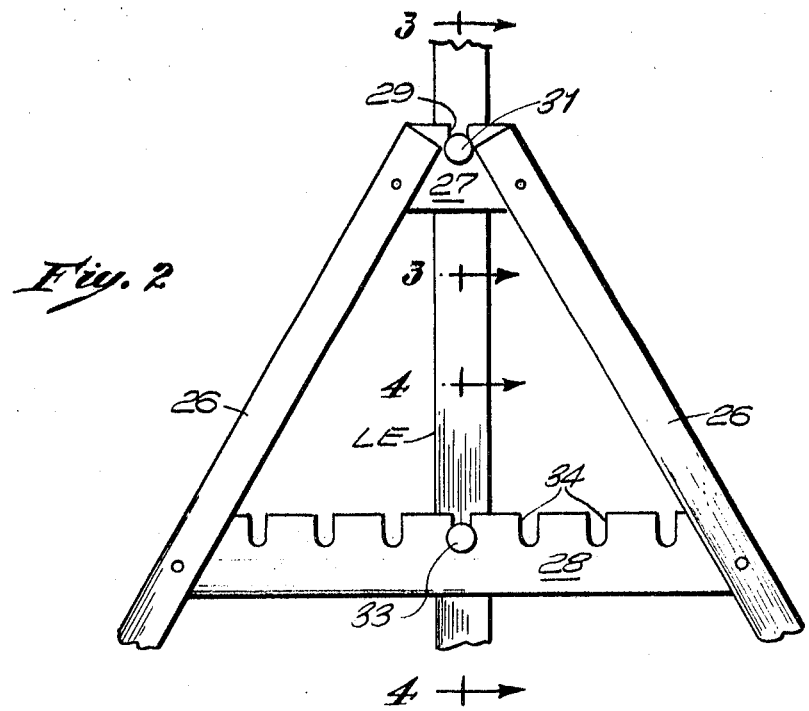
Figures 3, 4:
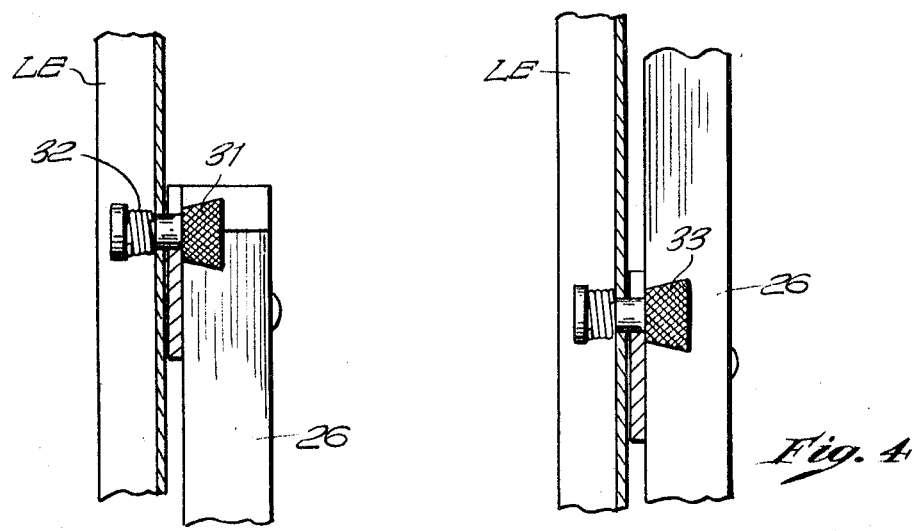
Figure 8:
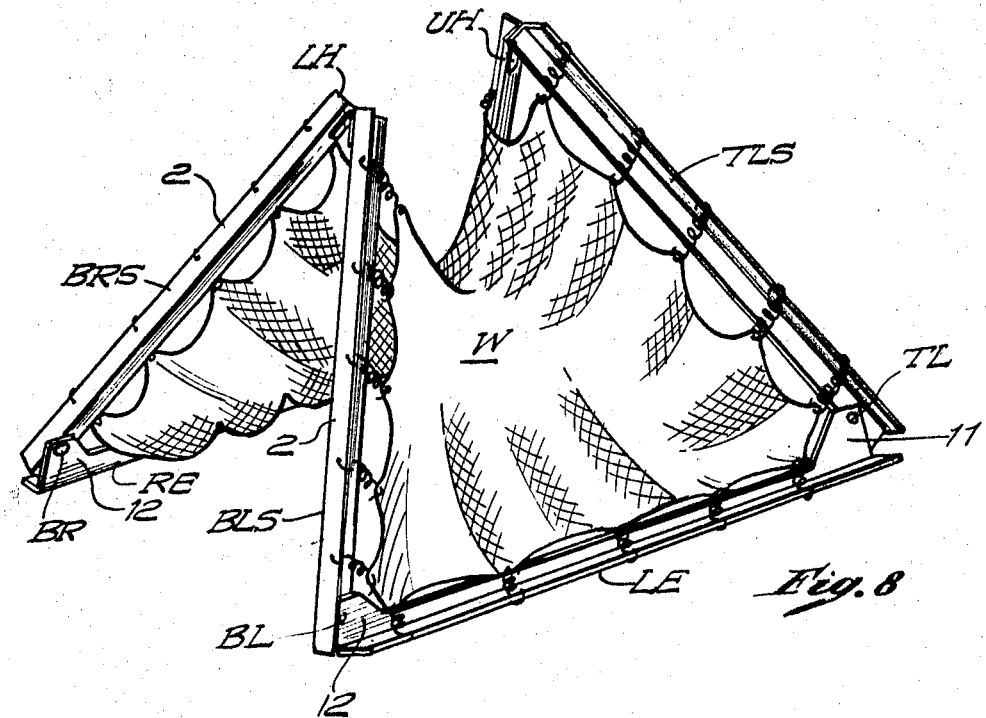
Figure 9:
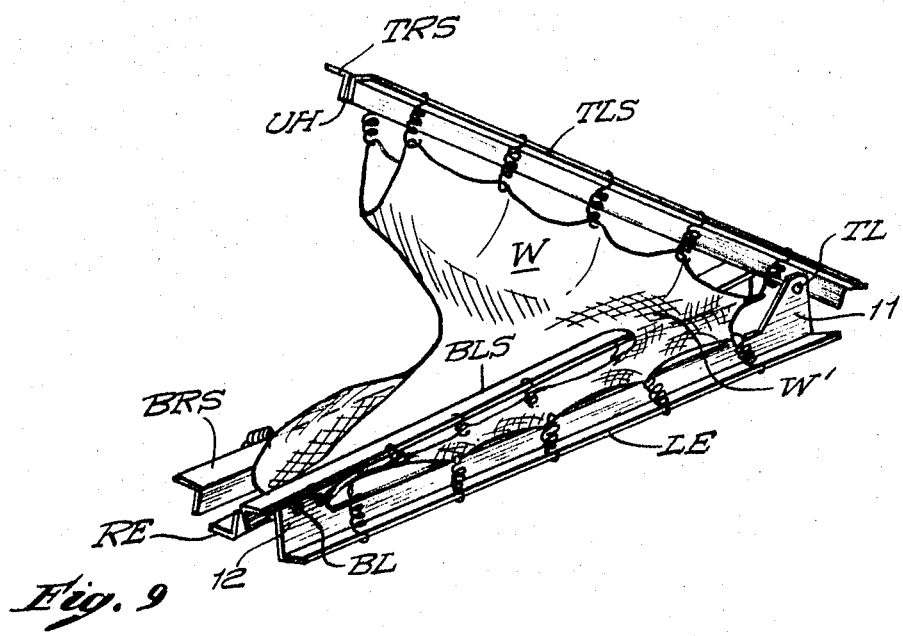
Figure 12:
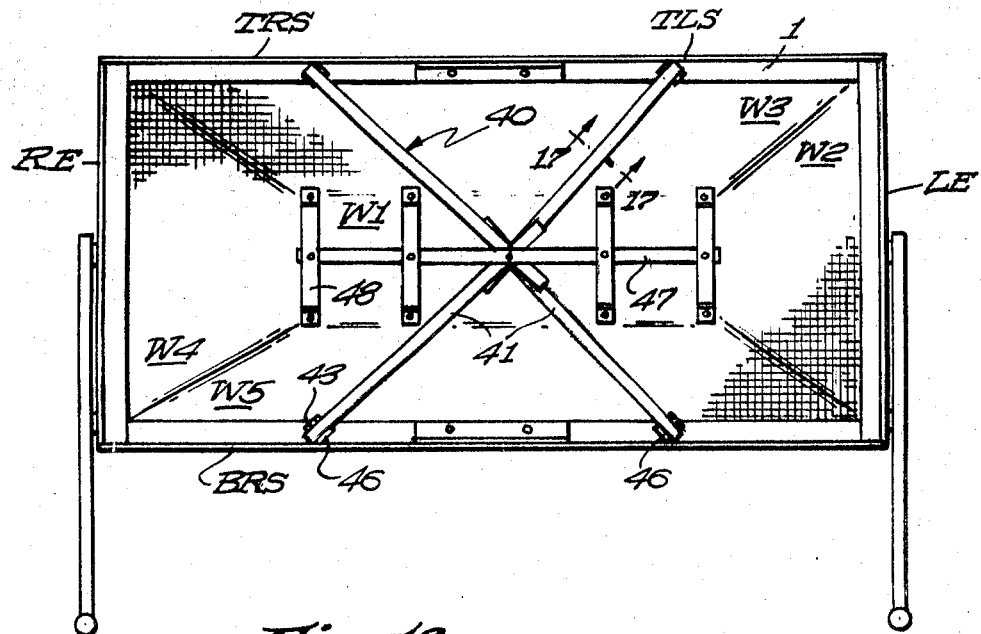
Figure 14:
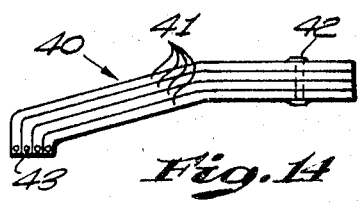
Figure 13:
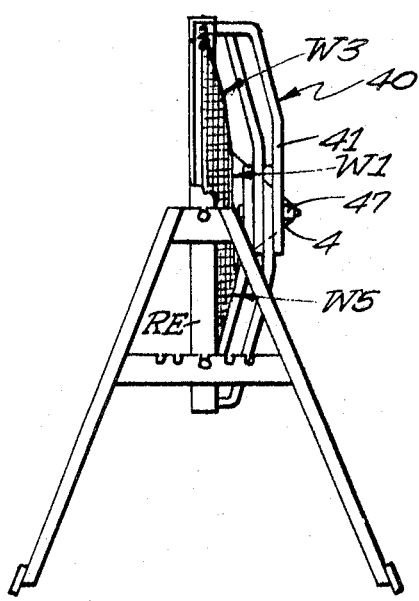
Figure 15:
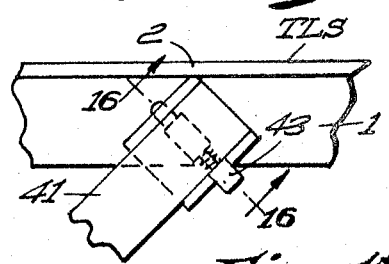
Figure 16:
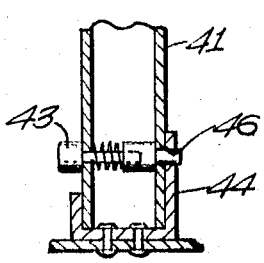
Figure 17:
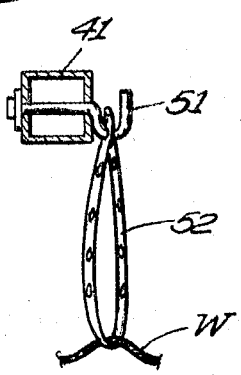
Figure 19:
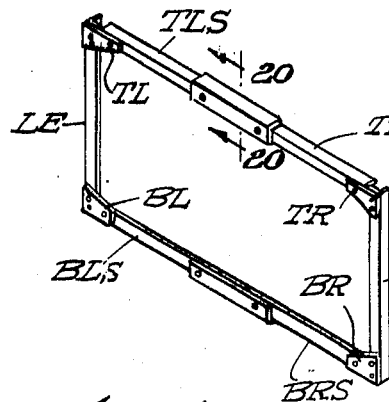
Figure 20:
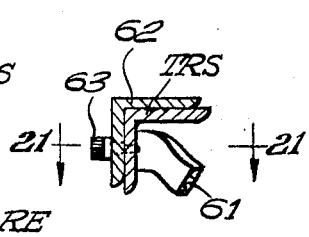
Figure 21:
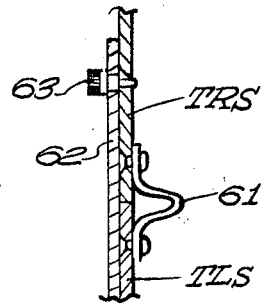
Figure 22:
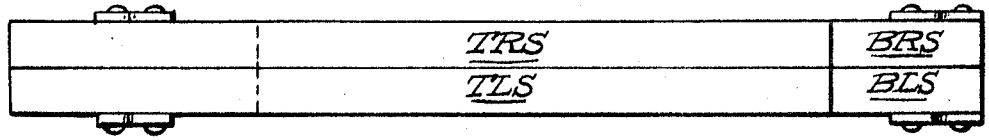
Figure 23:
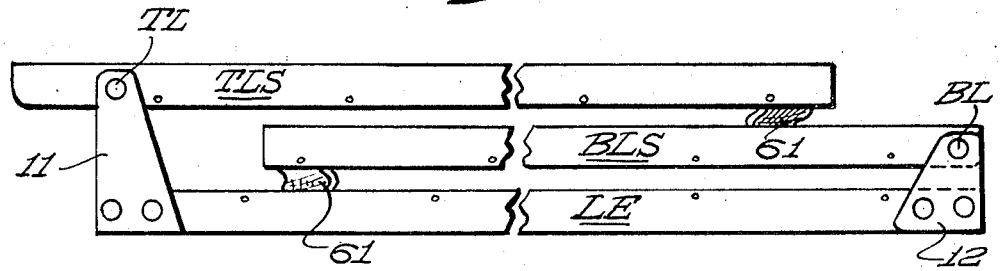
Figure 24:
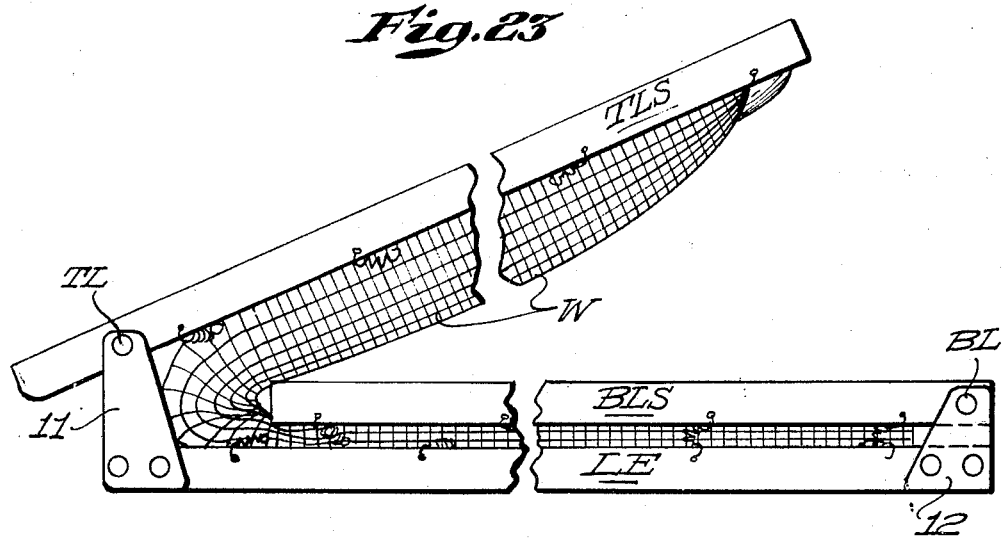

For the purpose of illustration typical embodiments of the invention are shown in the accompanying drawings in which:

FIG. 1 is an isometric view of one form of a rebound frame and net and its supporting standards;
FIG. 2 is an elevation of a standard;
FIG. 3 is a section on line 3—3 of FIG. 2;
FIG. 4 is a section on line 4—4 of FIG. 2;
FIG. 5 is an isometric view of a detail of a hinge of the screen;
FIG. 6 is a rear elevation of the same detail showing a reinforcing strap;
FIG. 7 is an end elevation of the detail of FIG. 6;
FIGS. 8 and 9 are isometric views showing stages of folding the screen;
FIG. 10 is a side elevation showing the frame folded;
FIG. 11 is a section on line 11—11 of FIG. 10;
FIG. 12 is a rear elevation of the screen frame, net and standards showing a screen stretcher;
FIG. 13 is an end elevation of the screen of FIG. 12;
FIG. 14 is a detail of the screen stretcher;
FIGS. 15 and 16 show details of the attachment of the stretcher to the screen frame;
FIG. 17 shows the connection between the stretcher and the net;
FIG. 18 is a diagrammatic showing of the stretched screen;
FIG. 19 is an isometric view of a modified form of frame;
FIG. 20 is a section on line 20—20 of FIG. 19;
FIG. 21 is a section on line 21—21 of FIG. 20;
FIG. 22 is a plan view of the frame of FIG. 19, folded;
FIG. 23 is a side elevation of the folded frame;
FIG. 24 is a similar side elevation showing the frame and net partially folded; and
FIG. 25 is an end view of the folded frame.

The tennis rebound net shown in FIGS. 1 to 11 comprises a rectangular frame formed of six metal L-beam members each having a front or face strip 1 and a flange strip 2. The six frame members include right and left end members RE and LE and two pairs of top and bottom side members, the top pair consisting of a top right side member TRS and top left side member TLS joined by an upper hinge UH, and a bottom pair consisting of a bottom right side member BRS and a bottom left side member BLS joined by a lower hinge LH. The top pair of side members are connected by pivot pins TR and TL respectively to legs 11 offset from the right and left end members RE and RL. Similarly the bottom pair of side members are connected by pivot pins BR and BL to legs 12 offset from the end members. For a reason to be explained the upper legs 11 are longer than the lower legs 12 so that the top pivots TR and TL are offset from the side members RS and LS a greater distance than are the bottom pivots BR and BL.

As shown in FIGS. 5 and 6 the upper hinge UH is secured to the top members TRS and TLS by rive's 14 and 16. The rear portions of the rivets 14 terminate in headed studs 15 adapted to be received in keyholes 17 of a reinforcing strap which spans the hinge UH and holds the frame in the rigid, extended rectangular form shown in FIG. 1. The lower hinge LH is similarly reinforced.

A rectangular web W of heavy netting is connected to the extended frame by a series of coiled tension springs 19 hooked at one end in holes 21 through the flanges 2 and looped through the peripheral strands of the net at their other ends (FIG. 7). The springs hold the net in rectangular shape under considerable tension when the frame is extended.

For use as a rebound screen the frame and net are supported on standards shown in FIGS. 1 to 4. Each standard comprises an A-frame having two legs 26 joined by a top plate 27 and a cross bar 28. Each top plate has a slot 29 receiving a knurl-headed pin 31 anchored on an end member RE or LE and clamped by a spring 32 on the plate.

Similar pins 33 anchored in the end members are clamped in one of several slots 34 at the upper edge of the cross bar 28 selected according to the angle at which it is desired to adjust the frame.

The screen is adapted to be folded compactly as shown in FIGS. 8 to 11. With the reinforcing straps 18 removed, the screen is first folded toward its front on its vertical center line through the hinges UH and LH bringing one of each pair of side members into parallelism with the other member of the pair. Also the two end members RE and LE are brought together in parallelism and the net is folded to half its full area. The bottom pair of parallel side members BRS and BLS are then swung on the pivots BR and BL toward the parallel end members, and then the top pair of parallel side members TRS and TLS are swung parallel to the bottom and end members. Because the top pivots TR and TL are offset from the end members RE and RL more than are the bottom pivots BR and BL, space is allowed for the parallel bottom side member between the parallel top side and end members as appears most clearly in FIGS. 10 and 11.

Of course, the designations top and bottom are used only for the purpose of description, and the longer legs 11 with the greater pivotal offset may be connected to either the top or bottom pair of side members, the shorter legs 12 for the lesser pivotal pivot being connected to the other pair.

As shown in FIGS. 9 and 11, the present pivotal arrangement of the L-beam members so disposes the folded members as to form channels in which the net may be stored. The right half of the net is stowed in two channel-shaped spaces 36 extending lengthwise between side members BRS and end member RL, and between side member BLS and end member LE. The center W' of the web is folded over the hinged end LH of the lower side members BRS and BLS, and the left half of the net is stowed in channel-shaped spaces 38 between the top right side member TRS and bottom right side member BRS, and between the top left side member TLS and bottom left side member BLS. Not only is the bulk of the folded screen reduced and the shape trim, but the web W is guarded by the L-beam flanges 2 against wearing and other damage.

A modified screen to be described may be folded as shown in FIG. 25 so that the face strips 1 of the L-beams more fully enclose and protect the net in channels 36' and 38'.

In the form shown in FIGS. 1 to 11 the web W is stretched in a flat rectangular form and will reflect tennis balls or the like at an angle dependent on the incidence of the ball. This flat form is particularly useful if the ball has high velocity, the web rebounding the ball with a flat trajectory.

For rebounding a ball with varied high and low trajectories, and at angles crossing more sharply in front of the player the screen may be modified as shown in FIGS. 12 to 18. In this modification a brace 40 comprising four bowed members 41 of aluminum tubing is attached at the back of the face flanges 1 of the screen of FIGS. 1 to 11. The bowed members are of different lengths so that they may be nested as shown in FIG. 14 while connected by a common pivot pin 42. As shown in FIGS. 15 and 16, the free ends of the bowed members 41 carry captive, spring-urged detent pins 43. The end of each bowed member is received in a U-shaped socket having a hole 46 receiving the pin 43. With all four bowed members secured in the sockets 46, the brace 40 serves to strengthen the frame, and also form part of a yoke for stretching the net. A bridge 47 is held on the back of the brace 40 by straps 48, both ends of which are secured to the web W along the edge of a central web panel W1. The central panel W1 is thereby drawn out of but parallel to the plane of the frame and side panels W2 to W5 are formed in planes converging at angles to the central panel W1. Shown schematically in FIG. 18 are the different rebounds produced by the five angularly related panels. The central panel W1 rebounds at a low trajectory as before. The lower panel W5 tends to kick the ball upward in a high trajectory, while the upper panel W3 deflects the ball downward. The left and right panels W2 and W4 tend to cross the ball in front of the player.

An alternate way of forming the panels is shown in FIG. 17, wherein a hook is secured in each bowed member 41, and a perforated strap 52 is looped through the web W and secured on the hook by its perforations. The deflection and tension of the central panel may be adjusted by selection of the perforations receiving the hook.

A modified screen shown in FIGS. 19 to 25 comprises the same end and side members and pivot legs as the screen of FIGS. 1 to 11, differing structurally in that each upper and lower pair of side members is loosley coupled by a fabric strap. When extended each pair is connected by a brace 62 secured to the top or bottom side members by thumb screws 63.

The loose coupling of the straps 61 permits the screen to be folded away from the front of the screen, rather than toward the front as shown in FIGS. 8 to 11. As a result the edges of the flange strips 2 of each pair of side members and of the end members approach and butt each other, and the face strips 1 lie outside the net. The face and flange strips thus enclose two channels 36' and 38' more fully protecting the web W.

While certain desirable embodiments of the invention have herein been illustrated and described, it is to be understood that these are mainly by way of example, and the invention is broadly inclusive of any and all modifications falling within the scope of the appended claims.

I claim:

1. A folding screen comprising:
two rigid end frame members,
two pairs of rigid side frame members,
coupling means connecting adjacent ends of each pair of side members to each other,
pivot means connecting the other end of each side member to one end of an end member so that the members may be arranged in rectangular form holding the web in a rectangle,
each said member comprising a face strip parallel to the plane of the rectangle and a flange strip extending normal to and on the same side of said plane as the other flange strips,
a rectangular web permanently connected around its periphery along a like strip of each of said members, with said members holding the web in a rectangle under tension in all directions,
said coupling and pivot means allowing said members to be folded into parallelism with each other with respective flange strips facing each other and with the face and flange strips of the members forming lengthwise channels between the members for protective storage of the web therebetween while attached to said strips adjacent said channels.

2. A screen according to claim 1 wherein the pivot means for one pair of side members is offset from respective end members a greater distance than the pivot means for the other pair of side members.

3. A screen according to claim 1 wherein said members comprise L-beams.

4. A screen according to claim 1 wherein the periphery of the web is connected to said members by resilient means spaced about the periphery to hold the web in tension when the members are in rectangular form.

5. A screen according to claim 1 wherein said web is a rebound net, and characterized by means for holding a central panel of said web out of the plane of said rectangle thereby to form angularly related panels around the central panel.

6. A screen according to claim 1 characterized by bowed members connected between said side members and tension members connected between said bowed members and said web for holding a portion of the web out of the plane of the rectangle.

References Cited

UNITED STATES PATENTS 1,608,290  11/1926  Basford _____ 5—112

FOREIGN PATENTS 397,260  8/1933  Great Britain.

RICHARD C. PINKHAM, Primary Examiner

THEATRICE BROWN, Assistant Examiner